(12) United States Patent
Trichell

(10) Patent No.: US 11,697,170 B2
(45) Date of Patent: Jul. 11, 2023

(54) SOLAR-POWERED PORTABLE HOUSING FOR A TOOL

(71) Applicant: Curtis Lee Trichell, Dayton, TX (US)

(72) Inventor: Curtis Lee Trichell, Dayton, TX (US)

( * ) Notice: Subject to any disclaimer, the term of this patent is extended or adjusted under 35 U.S.C. 154(b) by 0 days.

(21) Appl. No.: 16/675,202

(22) Filed: Nov. 5, 2019

(65) Prior Publication Data

US 2021/0135617 A1 May 6, 2021

Related U.S. Application Data

(63) Continuation of application No. 16/675,199, filed on Nov. 5, 2019.

(51) Int. Cl.
| | |
|---|---|
| *B23K 9/10* | (2006.01) |
| *H02S 40/38* | (2014.01) |
| *H02S 10/20* | (2014.01) |
| *H02S 10/40* | (2014.01) |
| *H02S 30/20* | (2014.01) |

(52) U.S. Cl.
CPC .......... *B23K 9/1043* (2013.01); *B23K 9/1081* (2013.01); *H02S 10/20* (2014.12); *H02S 10/40* (2014.12); *H02S 30/20* (2014.12); *H02S 40/38* (2014.12)

(58) Field of Classification Search
CPC .......... H02S 10/40; H02S 30/20; H02S 20/30; H01L 31/045; H01L 31/058; H01L 31/0583; H01L 31/0422; H01L 31/0424; F24J 2/36; F24J 2002/5277; F24J 2002/5288; F24J 2002/5479
USPC ................ 290/55; 416/142; 210/239, 251; 280/400; 320/101, 136; 62/235.1, 236, 62/457.9; 126/606, 710, 623, 574, 577, 126/573, 569, 578; 361/601, 825; 307/22, 26, 72; 52/173.3, 658; 135/87, 135/88.01, 88.15, 88.1, 88.17; 296/159
See application file for complete search history.

(56) References Cited

U.S. PATENT DOCUMENTS

| | | | |
|---|---|---|---|
| 10,239,642 B1 * | 3/2019 | Spence | .............. B64G 1/44 |
| 2011/0146751 A1 * | 6/2011 | McGuire | ............ F24S 30/425 |
| | | | 136/245 |
| 2011/0253614 A1 * | 10/2011 | Curran | ............... H02S 30/20 |
| | | | 136/245 |
| 2012/0313569 A1 * | 12/2012 | Curran | ............... H02S 10/40 |
| | | | 320/101 |

(Continued)

FOREIGN PATENT DOCUMENTS

WO  WO-2018050931 A1 *  3/2018

*Primary Examiner* — Ryan S Cannon
(74) *Attorney, Agent, or Firm* — Spradley PLLC; Michael Spradley

(57) ABSTRACT

A solar-powered portable housing for a tool is also disclosed herein. The solar-powered portable housing for a tool can comprise a battery, one or more solar panels, a plug, a top enclosure, a bottom enclosure, a first slideable wall, and a first solar panel. The solar panels can be connectable to the battery. The solar panels can provide power source to the battery. The plug can allow the battery be charged through an electric power source. The top enclosure can be capable of housing a tool. The bottom enclosure can be capable of housing the battery. The battery can be capable of providing power to the tool. The first slideable wall can be mounted to one side of the housing. The first solar panel can be mounted to the first slideable wall.

8 Claims, 16 Drawing Sheets

(56) References Cited

U.S. PATENT DOCUMENTS

| | | | | |
|---|---|---|---|---|
| 2013/0186450 A1* | 7/2013 | Smith | ............... | H02S 30/20 |
| | | | | 136/245 |
| 2013/0285595 A1* | 10/2013 | Eaton, Jr. | ............ | H02J 7/35 |
| | | | | 320/101 |
| 2014/0338720 A1* | 11/2014 | Caster | ............... | H02S 30/20 |
| | | | | 136/245 |
| 2015/0162865 A1* | 6/2015 | Cowham | ............ | F24S 25/70 |
| | | | | 136/251 |
| 2019/0305720 A1* | 10/2019 | Rogalka | ............ | H02S 30/20 |

* cited by examiner

SOLAR-POWERED PORTABLE HOUSING FOR A TOOL

BACKGROUND

This disclosure relates to a portable electric arc-welding system. A welding machine welds two or more pieces of metals together. To do so requires a significant amount of power. One method used to power a welding system is through an engine. Such method of welding is known as engine-driven welders. Such method makes use of a gasoline, diesel, or propane-fueled engine that can be connected to an electrical generator to produce power for welding. Engine-driven welding system can be effective in producing sufficient power source to be used for arc welding however, there can be situations wherein using such method can cause inconvenience, such as indoor welding. In such scenario, the indoor space should be well ventilated and/or should have a large space since welding fumes produced by engine-driven welding system can cause suffocation. Furthermore, engine-driven welding system can have a lot of parts such as seals, rings, gaskets, alternators, water pumps, cranks, blocks, and many other parts which can fail and may need constant replacement. Such scenario can be time consuming, inconvenient, and costly to the user. As such it would be useful to have a portable electric arc-welding system.

Further, the most common method of housing an arc-welding generator involves enclosing the arc-welding generator within an enclosure. Although housing arc-welding generator within an enclosure can be efficient in protecting the internal parts of arc-welding generator, such enclosure serves little other purpose. One concern of a portable electric arc-welding system is the amount of power needed to run such system. As such, it would be useful to have a solar-powered portable housing capable of powering tools.

SUMMARY

A portable electric arc-welding system is disclosed herein. The portable electric arc-welding system can comprise a battery, an electric welding machine, and a housing. The electric welding machine can comprise an electric motor, a governor, a main armature, and a shaft. The electric motor can be capable of converting electrical energy from the battery into rotatable mechanical energy. The governor can regulate a speed of the electric motor. The main armature can receive the rotatable mechanical energy from the electric motor and produces electrical power. The shaft can transfer the rotatable mechanical energy from the electric motor to the main armature. The housing can enclose the electric welding machine and the battery.

A solar-powered portable housing for a tool is also disclosed herein. The solar-powered portable housing for a tool can comprise a battery, one or more solar panels, a plug, a top enclosure, a bottom enclosure, a first slideable wall, and a first solar panel. The solar panels can be connectable to the battery. The solar panels can provide power source to the battery. The plug can allow the battery be charged through an electric power source. The top enclosure can be capable of housing a tool. The bottom enclosure can be capable of housing the battery. The battery can be capable of providing power to the tool. The first slideable wall can be mounted to one side of the housing. The first solar panel can be mounted to the first slideable wall.

DETAILED DESCRIPTION

Described herein is a portable electric arc-welding system. The following description is presented to enable any person skilled in the art to make and use the invention as claimed and is provided in the context of the particular examples discussed below, variations of which will be readily apparent to those skilled in the art. In the interest of clarity, not all features of an actual implementation are described in this specification. It will be appreciated that in the development of any such actual implementation (as in any development project), design decisions must be made to achieve the designers' specific goals (e.g., compliance with system- and business-related constraints), and that these goals will vary from one implementation to another. It will also be appreciated that such development effort might be complex and time-consuming, but would nevertheless be a routine undertaking for those of ordinary skill in the field of the appropriate art having the benefit of this disclosure. Accordingly, the claims appended hereto are not intended to be limited by the disclosed embodiments, but are to be accorded their widest scope consistent with the principles and features disclosed herein.

Figure 1:
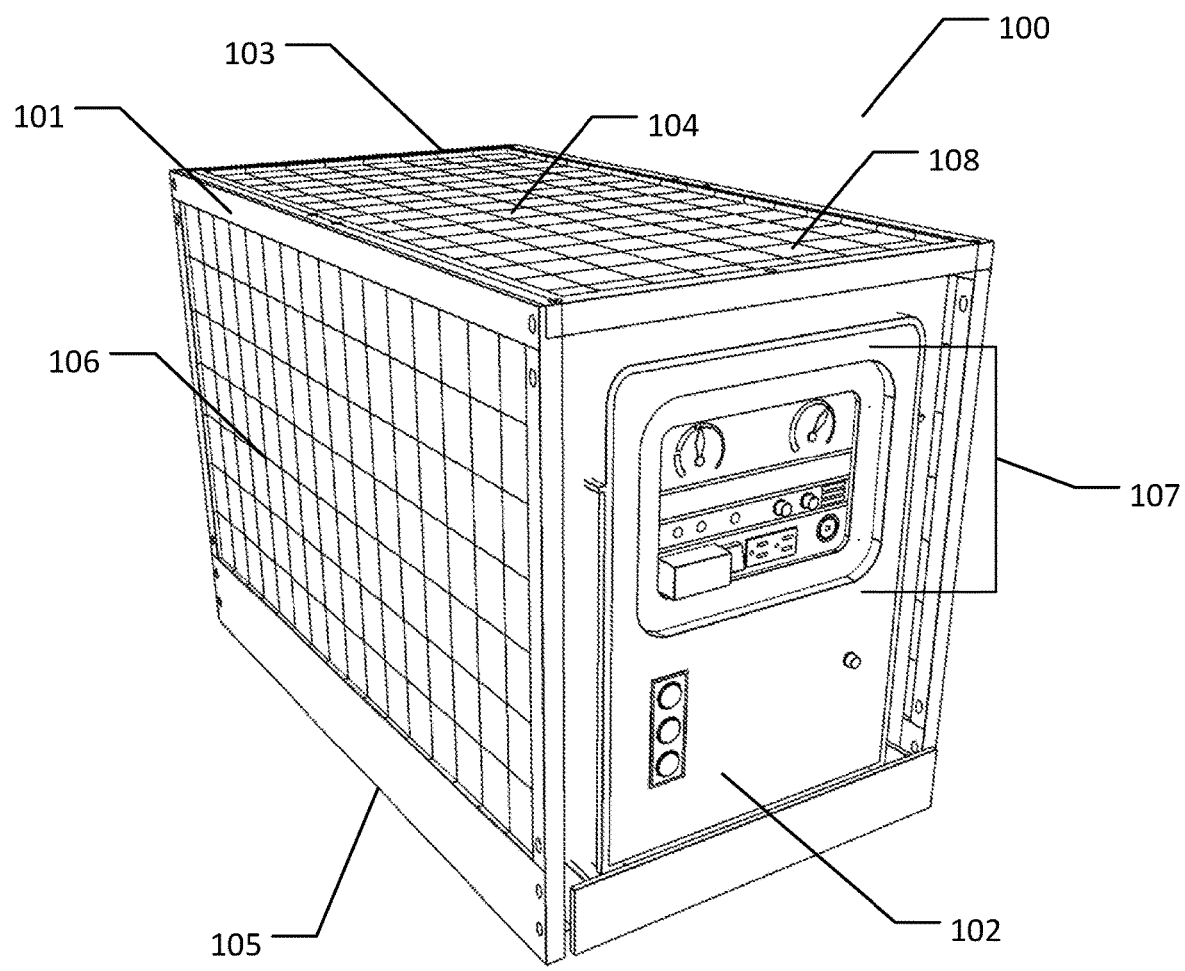
FIG. 1 illustrates an electric arc-welding system mounted in a housing.

FIG. 1 illustrates an electric arc-welding system 100 mounted in a housing 101. In one embodiment, arc-welding system 100 can comprise a welding machine and an electric power supply mounted within housing 101. In one embodiment, power supply used for the welding machine can be a rechargeable battery. In one embodiment, the rechargeable battery can be recharged through an electrical power source. In another embodiment, the battery can be recharged through a solar power source, which can be described below. Housing 101 can enclose and protect internal components of arc-welding system 100 with a plurality of walls 101a. In such structure, walls 101a can comprise a front wall 102, a back wall 103, a top wall 104, a base 105, and a pair of sidewalls 106. In one embodiment, one or more sidewalls of housing 101 can be permanently fixed to each other. For example, front wall 102, back wall 103, top wall 104, base 105, and sidewalls 106 can be permanently attached together. In this embodiment, the outer surface of front wall 102 can comprise a control panel 107 while the other outer surface of housing 101 such as back wall 103, top wall 104, and sidewalls 106 can comprise a plurality of solar panels 108. In another embodiment, sidewalls 106 can be slideable and maneuverable into a horizontal position. In such embodiment, the inner surface of sidewalls 106 can comprise solar panels 108. In one embodiment, control panel 107 can be accessible from an outside of housing 101. In this embodiment, control panel 107 can be accessible from front wall 102. Control panel 107 can comprise set of gauges, actuators, buttons, and set of displays that can control and/or indicate measurement of various parameters of arc-welding system 100.

Figure 2:
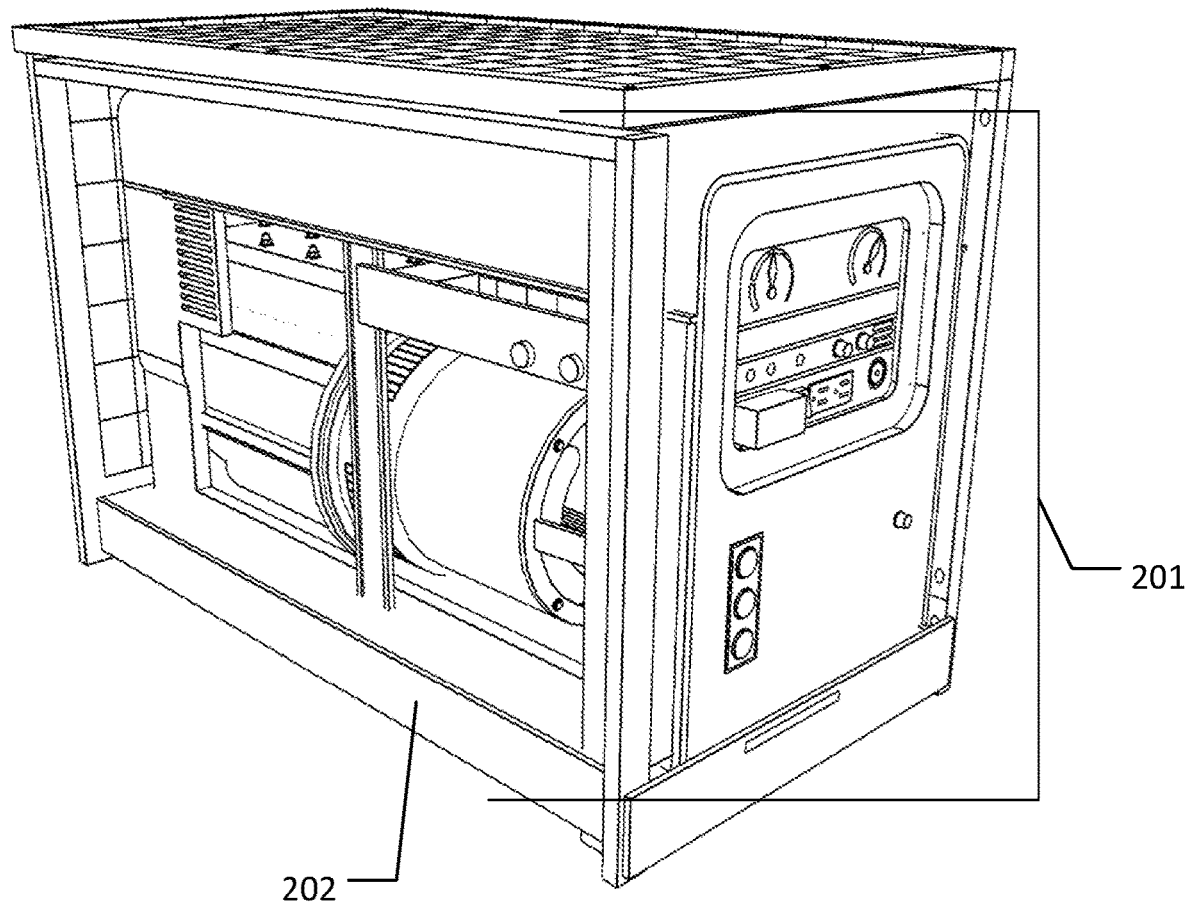
FIG. 2 illustrates an embodiment of housing.

FIG. 2 illustrates an embodiment of housing 101 further comprising a top enclosure 201 and a bottom enclosure 202. Top enclosure 201 and bottom enclosure 202 can each be a casing capable of housing a tool such as a welding machine. In this embodiment, top enclosure 201 can secure internal components of the welding machine such as an electric motor, a governor, a main armature, and an exciter armature. Bottom enclosure 202 can be a casing at the bottom portion of housing 101. Bottom enclosure 202 can house a rechargeable battery. Further in this embodiment, walls 101a can be capable of covering the entire sides of housing 101. As such, walls 101a can be used to close top enclosure 201 and bottom enclosure 202.

Figure 3:
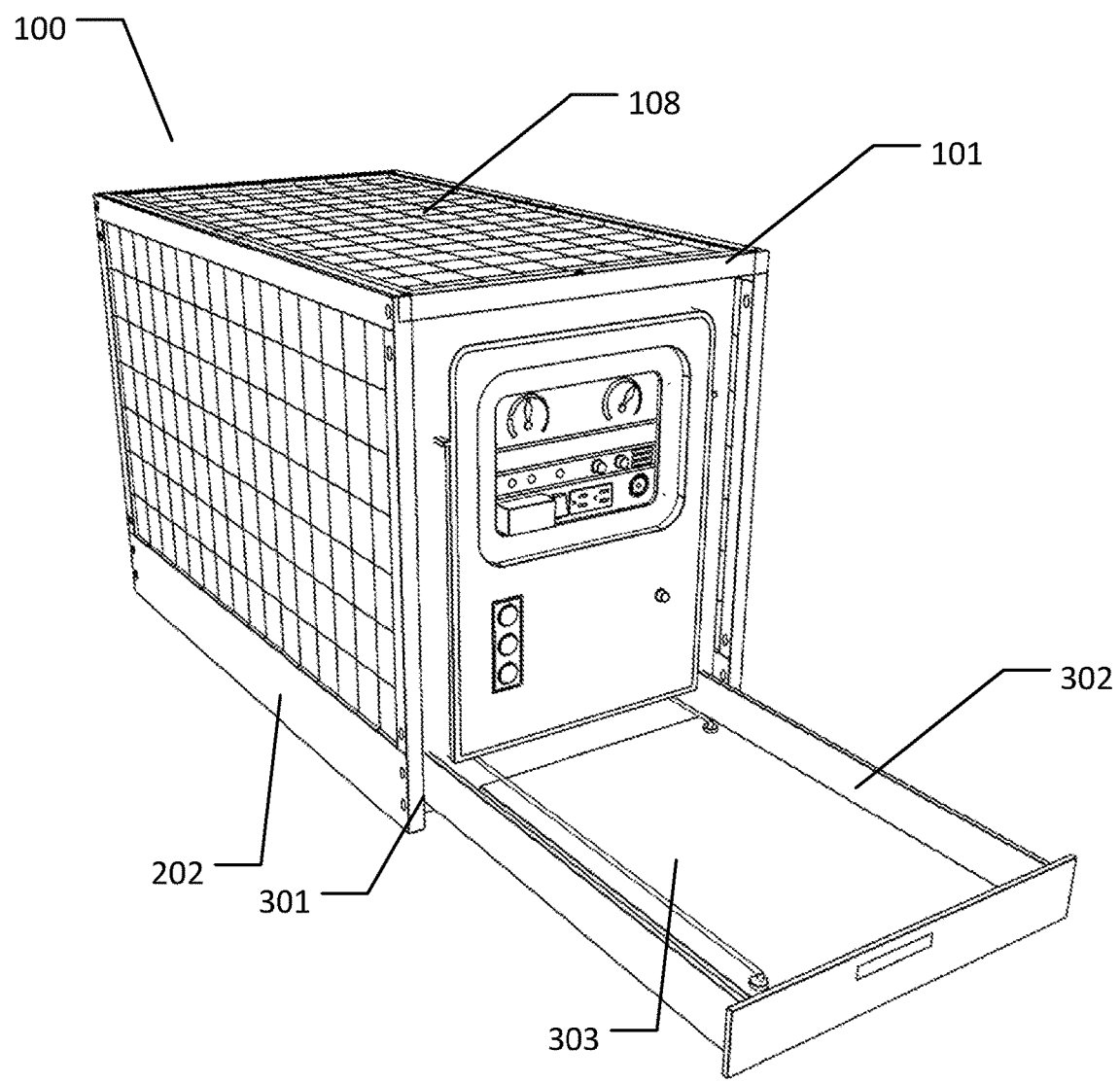
FIG. 3 illustrates a housing with a bottom enclosure.

FIG. 3 illustrates housing 101 with bottom enclosure 202 comprising a slot 301 and a drawer 302. Slot 301 can be an opening at the front surface of bottom enclosure 202 insertable by drawer 302. Drawer 302 can be a box shaped compartment capable of mounting a battery 303. In one embodiment, drawer 302 can be placed within slot 301 on bottom enclosure 202. As such, drawer 302 can be slideably removable from bottom enclosure 302. Battery 303 can provide electrical energy to allow welding system 100 to operate. In one embodiment, battery 303 can be a rectangular rechargeable battery that can fit snugly within drawer 302. Further in this embodiment, battery 303 can be slidably removable from bottom enclosure 202. As such when battery 303 needs replacing, a user can slidably move drawer 202 out of slot 201, then take out and replace battery 303 with a new battery 303.

Further in this embodiment, battery 303 can provide enough power to operate arc-welding system 100. In a preferred embodiment, battery 303 is 10 kWh or more. Further, battery 303 in a preferred embodiment is rechargeable. In another embodiment, battery 303 can be recharged through solar panels 108. In such embodiment, solar panels 103 can be connectable to battery 303. Solar panels 108 can convert ultraviolet radiation from sunlight into useable energy. Solar panels 108 can be used for generating electricity and can be used to provide power source for the rechargeable battery of arc-welding system 100. Solar panels 108 can be placed around the outer surface of housing 101 to ensure that solar panels 108 can absorb enough energy to power welding system 100.

Figure 4:
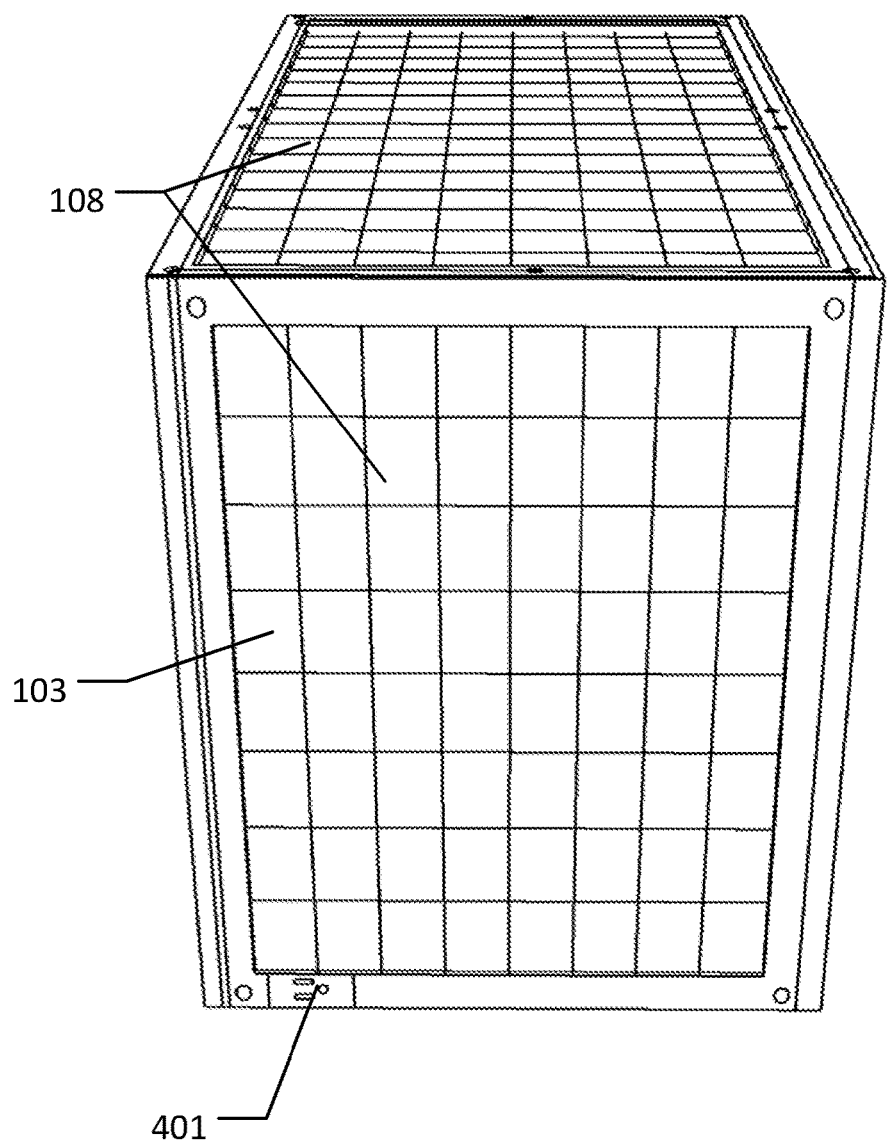
FIG. 4 illustrates a back view of housing.

FIG. 4 illustrates a back view of housing 101 comprising a plug 401. In a preferred embodiment, plug 401 can be placed at the bottom edge of back wall 103. Such embodiment can allow plug 401 be more accessible. Moreover, such placement of plug 401 can provide clearance at the back of welding system 100 that can be used to accommodate other devices that can be placed on a truck bed. Plug 401 can allow battery 303 be charged through an electric power source. Once recharged, battery 303 can be capable of powering up arc-welding system 100. Additionally, battery 303 can be charged by solar panels 108. Further, placement of solar panels 108 around the outer surface of arc-welding system 100 can maximize energy retention and optimize energy transfer efficiency of battery 303. In such embodiment, welding system 100 can be used even when an electric power source may not be available. Moreover, rechargeable battery 303 can allow welding system 100 to be used and transportable to locations without a local power source.

Figure 5:
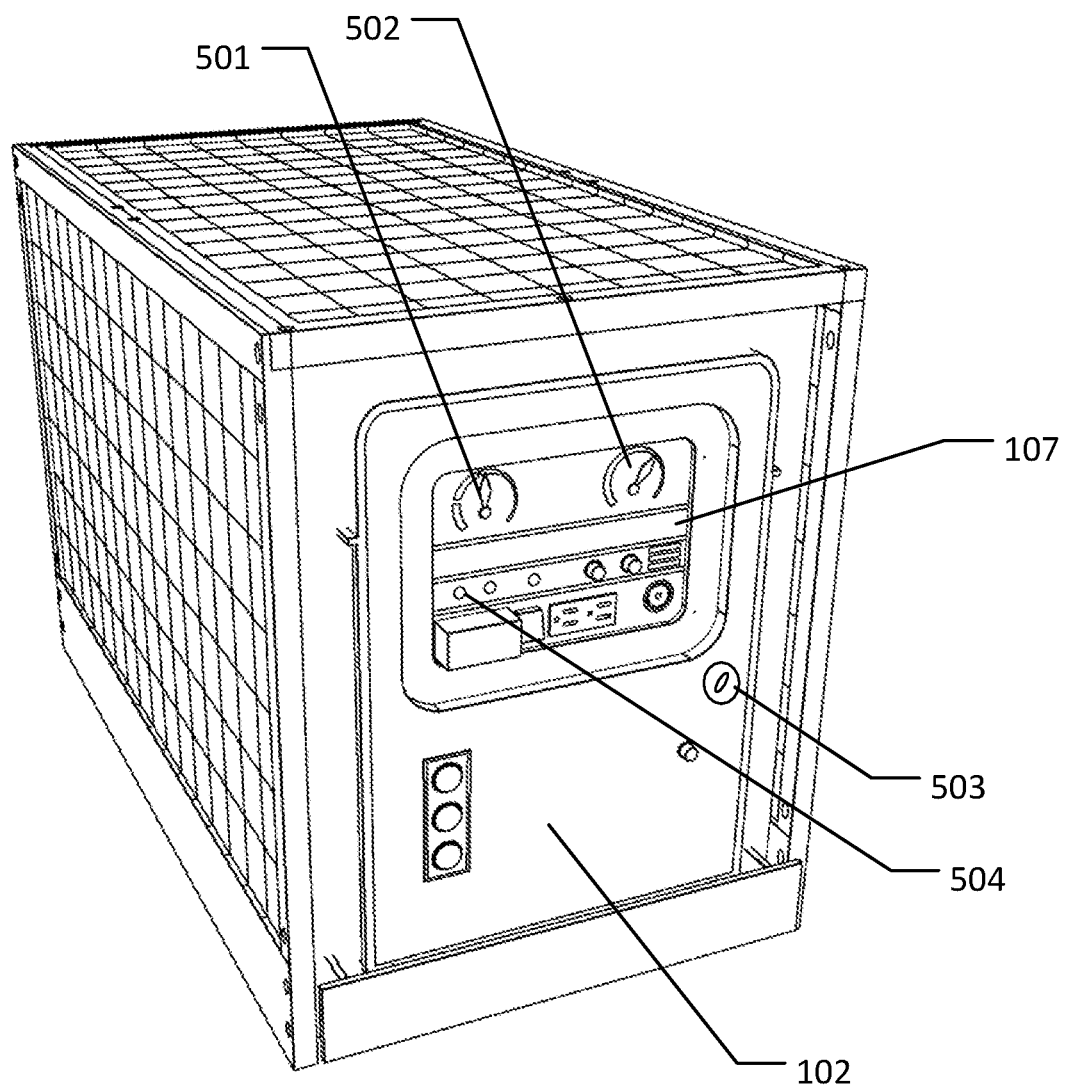
FIG. 5 illustrates a control panel of a welding system.

FIG. 5 illustrates control panel 107 of arc-welding system 100. In this embodiment, control panel 107 can be placed at the outer surface of front wall 102. In one embodiment, control panel 107 can comprise an amp range selector 501, a fine current selector 502, and an rpm dial 503. Amp range selector 501 can allow the user to select a current within a current range to use for welding. Fine current selector 502 can allow the user to select control of the arc characteristics. Rpm dial 503 can be used to fine-tune the rpms (revolutions per minute) of the motor. As such, RPM dial can adjust rpms of the electric motor. Further in one embodiment, control panel 107 can further comprise a power button 504. Power button 504 can allow arc-welding system 100 to be turned on and or off. In one embodiment power button 504 can be a switch.

Figure 6A:
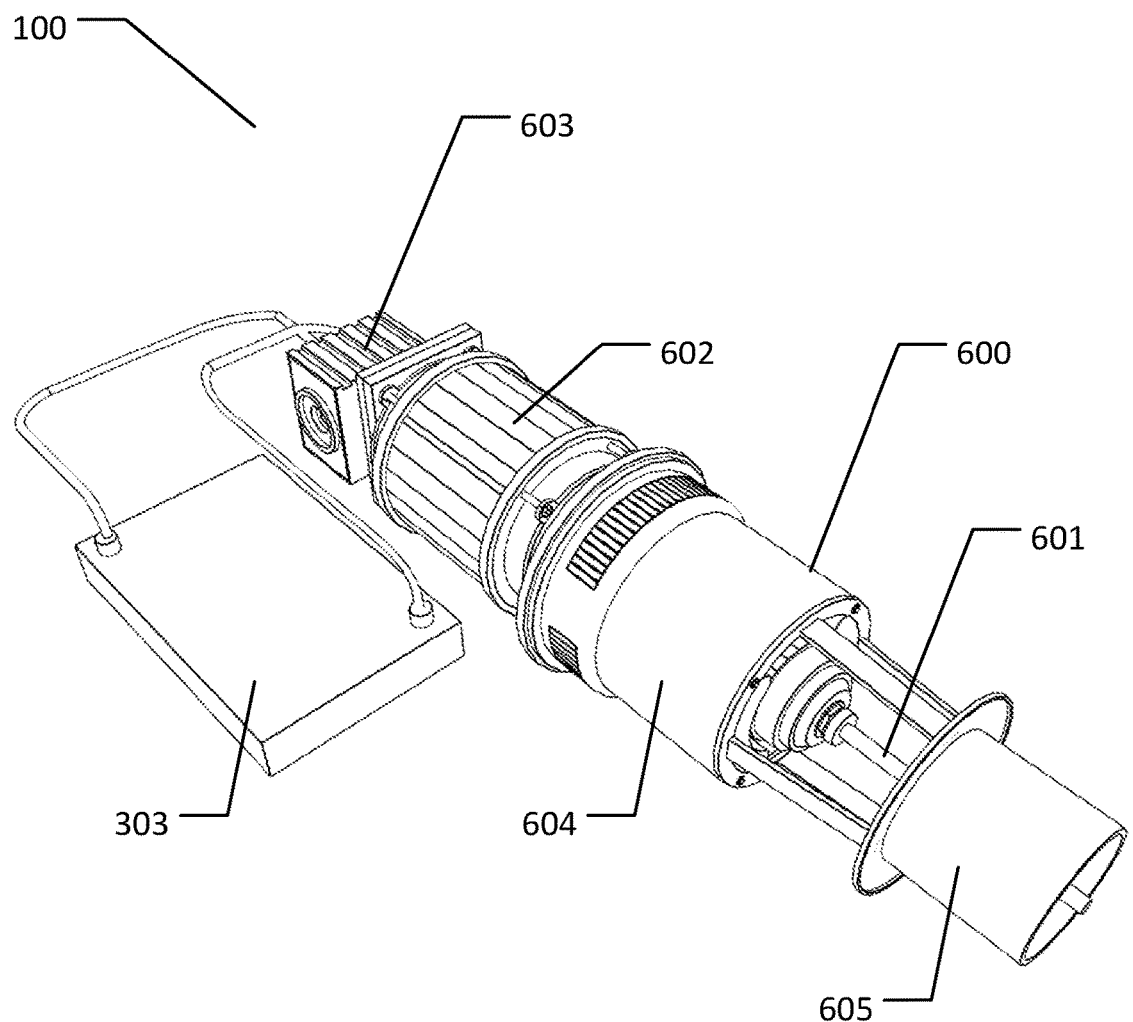
FIG. 6A illustrates internal components of an arc-welding system.

FIG. 6A illustrates internal components of arc-welding system 100. In one embodiment, arc-welding system 100 can comprise a welding machine 600 connected to battery 303. For purposes of this disclosure, welding machine 600 can be an electric arc welding machine that can be used to weld metals by generating sufficient heat to soften metals to connect them together. Welding machine 600 can comprise a shaft 601, an electric motor 602, a governor 603, a main armature 604, and/or an exciter armature 605. Electric motor 602 and governor 603 can be connected to battery 303.

Figure 6B:
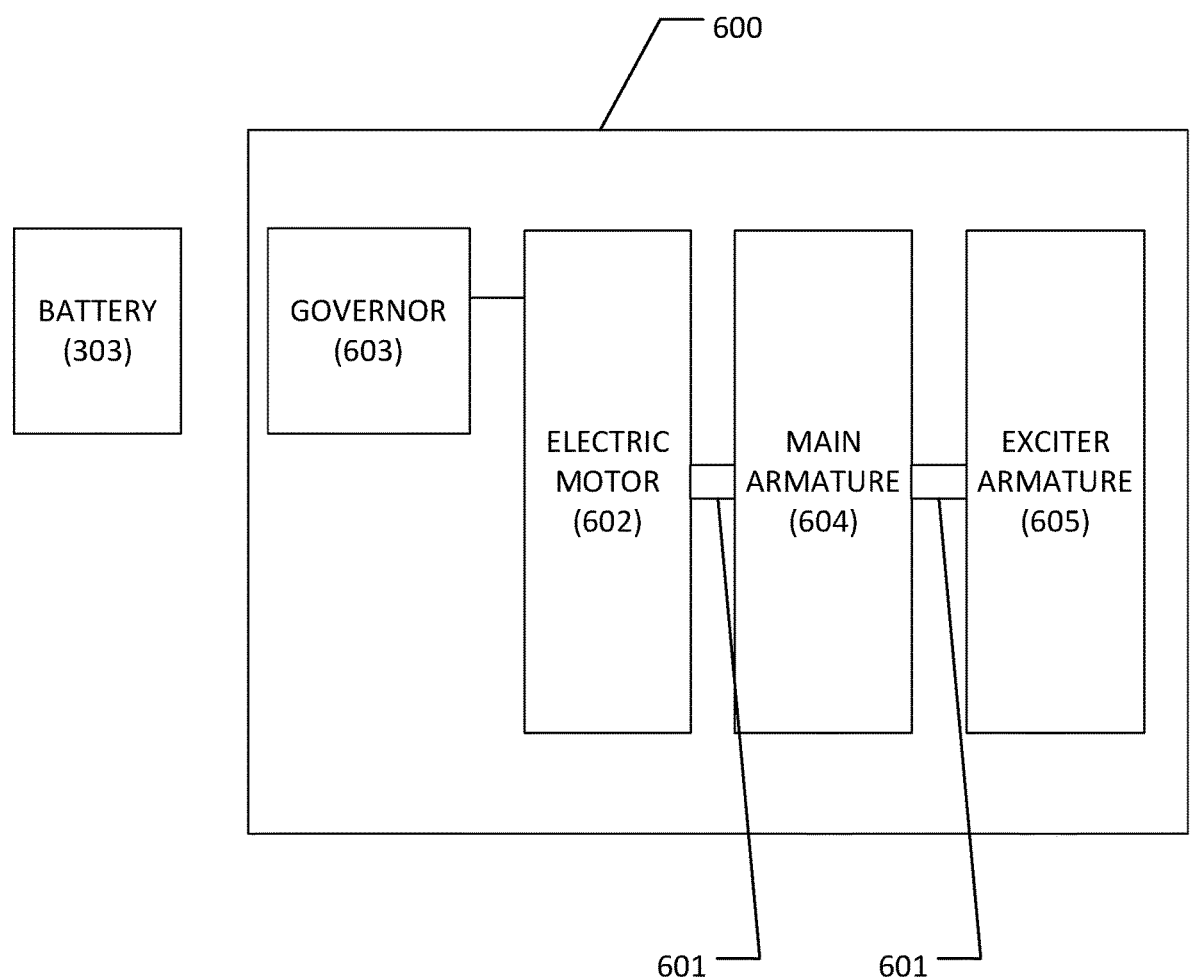
FIG. 6B illustrates a block diagram of a welding machine powered by a battery.

FIG. 6B illustrates a block diagram of welding machine 600 powered by battery 303. In a preferred embodiment, electric motor 602 can be a direct-current (DC) motor. Electric motor 602 can convert electrical energy from battery 303 into a rotatable mechanical energy. Electric motor 602 can be driven by governor 603 and can range between 900 and 3600 RPM in a preferred embodiment. As such, governor 603 can regulate the speed of electric motor 602. Shaft 601 can then transfer the rotatable mechanical energy from electric motor 602 to main armature 604. Thus, electric motor 602 can turn main armature 604 and/or exciter armature 605. Main armature 604 can receive the rotatable mechanical energy from electric motor 602 and can produce electrical power. Main armature can provide electrical power for welding, while exciter armature can, in one embodiment receive the rotatable mechanical energy from electric motor 602 and produces electrical power for outlets. Main armature 604 and exciter armature 605 can each deliver single-phase or three-phase alternating current.

Arc-welding system 100 can be used in chemical plants, refineries, pipelines, and other major industries that use rig welders. Further, an example of arc-welding system 100 can be a cross-country welding machine. In one embodiment, arc-welding system 100 can have an intuitive constant current (CC), constant voltage (CV), and can have TIG mode control. In one embodiment, welding system 100 can be capable of dual continuous-controlled output.

For purposes of this disclosure, arc-welding system 100 that runs welding machine 600 generator can have an advantage on how to work the puddle when arc welding. Welding machine 600 can be used to bump the rack and completely change the way welding machine 600 carries metal. A rack can hold brushes for main armature 604. This can allow a user to bump the rack so that welding machine 600 can weld differently, changing the open-circuit voltage (OCV's). As such, RPM dial 503 can be actuated to turn the rpms up or down of electric motor 601 depending on the desired OCVs. Such feature can change the way welding machine 600 can weld to a user's preference. Furthermore governor 603 can also change rpms on welding machine 600 to +/−100 rpms. Moreover, a user of welding machine 600 can change the brushes from 200s, to 200/300 staggered, or iron stackers, as examples.

In one embodiment wherein arc-welding system 100 can comprise power button 504, turning power button 504 on can allow battery 303 to supply electric power to electric motor 602 which can operate welding machine 600. Concurrently, governor 603 can be powered by battery 303. As such, governor 603 can be used to measure and regulate the speed of the welding machine 600. The electric power transmitted by battery 303 to electric motor 602 can then be converted from electrical energy into mechanical energy. The mechanical energy produced by electrical motor 602 can cause shaft 601 to rotate. Since shaft 601 can connect main armature 604 and exciter armature 605 to electric motor 602, shaft 601 can transmit the energy to main armature 604 and exciter armature 605. Main armature 604 and exciter armature 605 can then transmit a current across the welding machine 600.

Figure 7A:
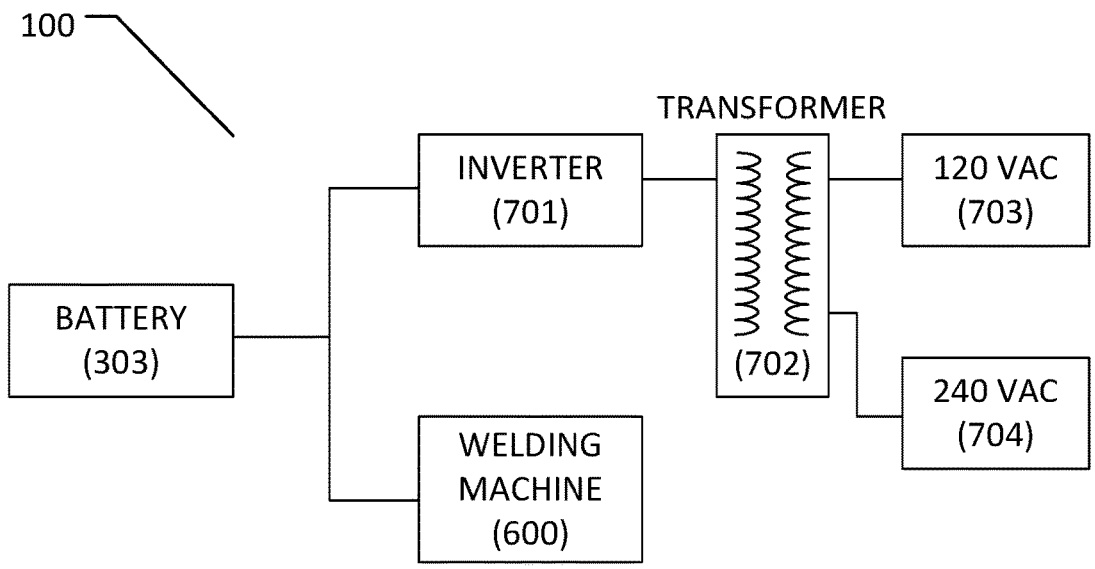
FIG. 7A Figure a circuit diagram of an arc-welding system.

FIG. 7A illustrates a block circuit diagram of arc-welding system 100. In this embodiment, arc-welding system 100 can comprise battery 303, an inverter 701, and a transformer 702. Inverter 701 can receive a direct current (DC) from battery 303. Moreover, inverter 701 can convert direct current (DC) voltage from battery 303 to an alternating current (AC) voltage. After receiving DC voltage from battery 303, inverter 701 can then increase DC voltage and changes the DC current to alternating current before sending it to transformer 702. Transformer 702 can receive the AC voltage from inverter 701 then, transformer 702 can be used to either step up or step down the AC voltage while maintaining power at the same level. In this embodiment, transformer 702 can be a dual voltage transformer. As such, transformer 702 can be capable of generating 120 VAC 703 and/or 240 VAC 704 to supply outlets. In this embodiment, electrical energy from battery 303 can be continuously transmitted to welding machine 600, and transformer 702.

Figure 7B:
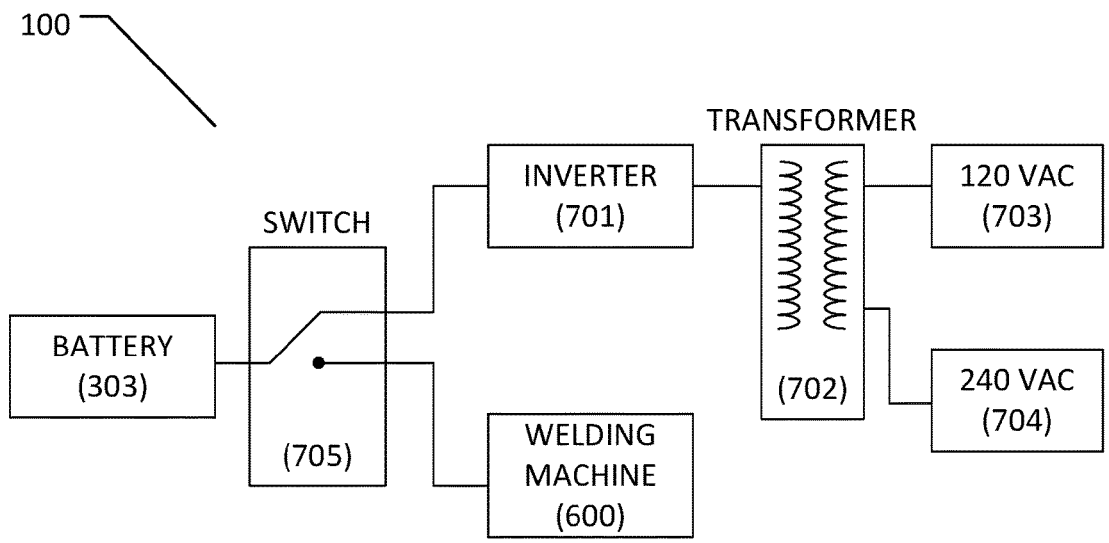
FIG. 7B illustrates another circuit diagram embodiment of an arc-welding system further comprising a switch.

FIG. 7B illustrates another block circuit diagram embodiment of arc-welding system 100 further comprising a switch 705. Switch 705 can allow the flow of electric energy from battery 303 be transmitted to either welding machine 600 or transformer 702. In such embodiment, when switch 705 is in a first position, the electric energy from battery 303 can be transmitted to inverter 701 and no electrical energy is transmitted to welding machine 600. Inverter 701 can then convert DC into AC and transmit the energy to transformer 702 and subsequently 120 VAC 703 and/or 240 VAC 704 to supply outlets. Transformer 702 can then be used to adjust voltage. Conversely, when switch 705 is in a second position, electric energy from battery 303 can be transmitted to welding machine 600 or some other tool in housing 101, allowing the machine to operate. Welding machine 600 or some other tool can connect to power from transformer 702 by any way known in the art, including through an outlet inside or outside housing 101, or hardwiring. In such state, no electrical energy is transmitted from battery 303 to transformer 702.

Figure 8:
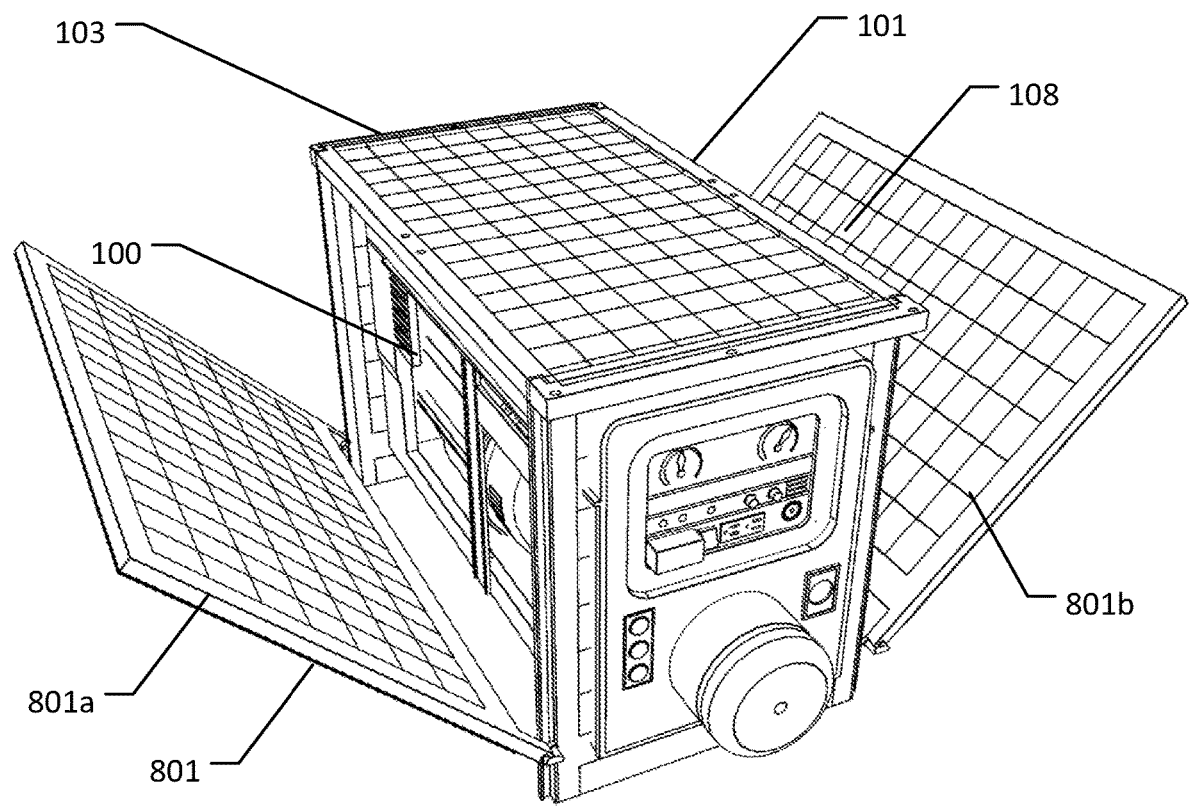
FIG. 8 illustrates an embodiment of housing comprising one or more slideable walls.

FIG. 8 illustrates an embodiment of housing 101 comprising one or more slideable walls 801. Slideable walls 801 can be a flat structure that encloses the internal section of housing 101. In one embodiment, slideable wall 801 can attach to back wall 103. In a preferred embodiment, slideable walls 801 can attach at opposite sides of housing 101. In this embodiment, slideable walls 801 can comprise a first slideable wall 801a, and a second slideable wall 801b. First slideable wall 801a can be mounted to one side of housing 101, while second slideable wall 801b can be mounted to a second side of housing 101. As such, second slideable wall 801b can be placed at the opposite side of first slideable wall 801a. In such embodiments, each solar panel 108 can mount the inner surface of each slideable wall 801a and 801b. As such, in a close position, solar panels 108 can face an interior of housing 101. Moreover, when slideable walls 801 can be in an open position, solar panels 108 at the inner surfaces of each slideable wall 801 can face away from the interior of housing 101. Furthermore, slideable wall 801 can slide upwards using a track and guide system and then angled horizontally upward such that solar panels 108 can be facing the sun. Such embodiment can allow slideable walls 801 to be maneuvered upwards without requiring free space around arc-welding system 100. This feature can be useful in cases wherein welding system 100 is placed on a confined space such as the truck bed and surrounded with other tools and devices. Thus, slideable walls 801 can be positioned to face and catch the sunlight without having to remove any tools, devices, and other obstructions around housing 101. Since any obstructions or shading of object can affect the amount of sun light that reaches solar panels 108, having slideable walls 801 can be useful in efficiently positioning solar panels 108 such that solar panels 108 can maximize the amount of solar radiation that the panels can receive.

Figure 9A:
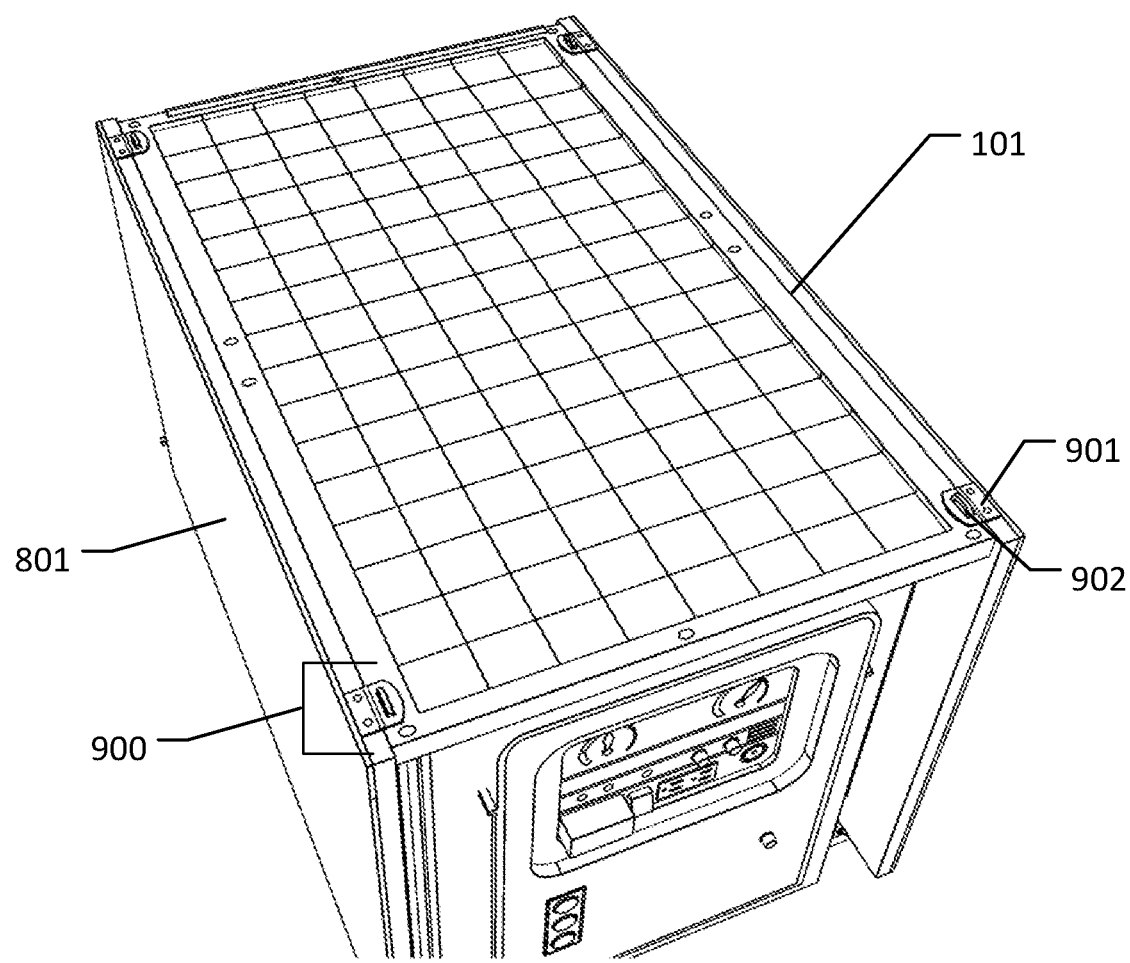
FIG. 9A illustrates a slideable wall attached at the opposite side of a housing.

FIG. 9A illustrates slideable walls 801 attached at the opposite sides of housing 101. In this embodiment, the top edge of each slideable wall 801 can attach to housing 101 through a fastener system that can hold slideable walls 801 in a closed position. In one embodiment, the fastener system can comprise a hook and a latch. In such embodiment, a hook and latch system 900 can ensure that slideable walls 801 are secured to the sides of housing 101. As an exemplary embodiment, one or more hook 901 can attach to the top edge of each slideable wall 801 while one or more latch 902 can attach to the opposite sides of housing 101. Hooks 901 can be attached on slideable wall 801 such that hooks 901 are aligned to each of latches 902 that are attached to housing 101. As such, hooks 901 can be mateable with said latches 902

Figure 9B:
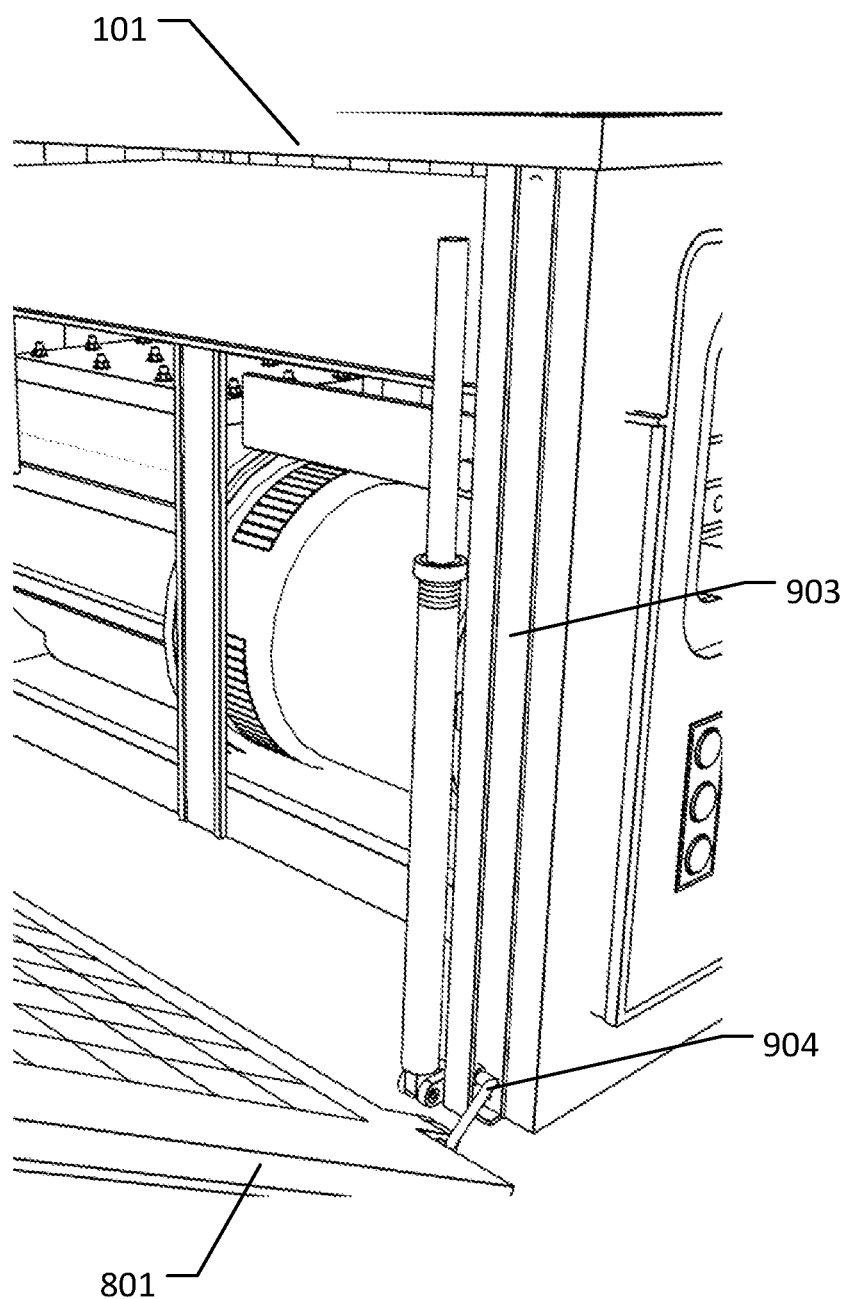
FIG. 9B illustrates how a slideable wall can be maneuvered into a horizontal position.

FIG. 9B illustrates how slideable walls 801 can be maneuvered into a horizontal position. Initially, slideable walls 801 can be unhooked from latches 902 on housing 101. Unhooking frees the upper portion of slideable walls 801, which can allow the user to slidably maneuver slideable walls 801 into a desired horizontal position. In this embodiment, housing 101 can comprise one or more pairs of tracks 903 that can be compatible with one or more pairs of guides 904 that can attach to the opposite bottom edge portions of each slideable wall 801. Tracks 903 can attach vertically to the opposite side of each sidewall 106. Moreover, guides 904 can be slideably fixed within tracks 903. In such structure, slideable walls 801 be slidably maneuvered from the bottom of tracks 903 to the top of tracks 904 in a vertical position. As such, slideable walls 801 can be vertically maneuverable along tracks 903.

Figure 9C:
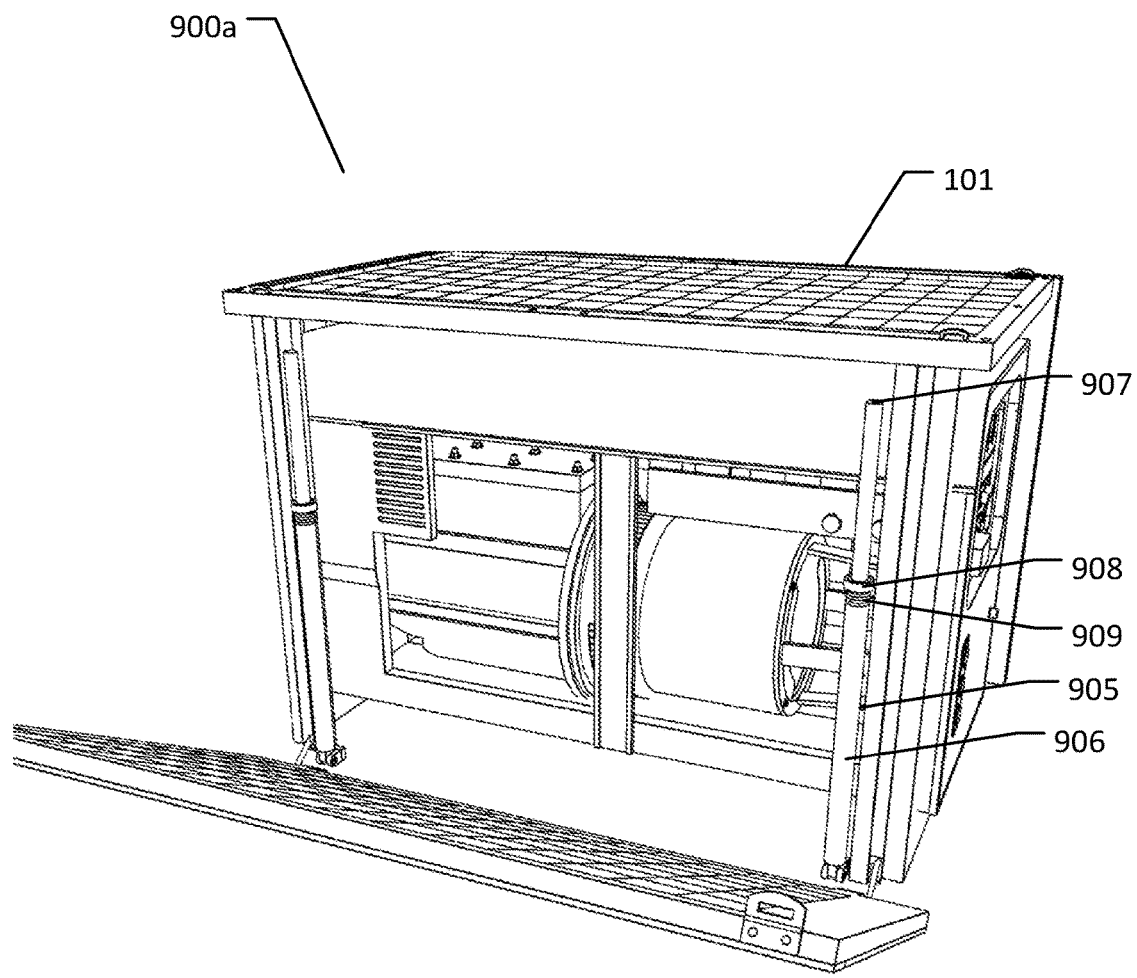
FIG. 9C illustrates a housing comprising one or more extendable rods in a retracted position.

FIG. 9C illustrates housing 101 comprising one or more extendable rods 905 at a retracted position 900a. Extendable rods 905 can be capable of supporting slideable walls 801 in a desired horizontal position. In one embodiment, extendable rods 905 can be telescopically extendable. In such embodiment, each extendable rod 905 can comprise a first member 906, a second member 907 and a lock mechanism 908. First member 906 can be a cylindrical pole that can be maneuverable within second member 907. In such embodiment, a portion of first member 906 can be placed within second member 907 wherein first member 906 can retract and/or extend from second member 907. As such, extendable rods 905 can be positionable in retracted position 900a, and an extended position. In retracted position 900a, slideable walls 801 can be at a closed position wherein slideable walls 801 can rest at the opposite sides of housing 101, as shown in FIG. 9A. Further in one embodiment, structure of extendable rods 905 can resemble a telescopic displacement. In one embodiment, the top edges of second member 907 can comprise a plurality of ridges 909, which can be mountable by a lock mechanism 908. In such embodiment, lock mechanism 908 can be rotated, which can tighten the inner diameter of ridges 909 towards first member 906 locking second member 907 at a desired length. As such, lock mechanism 908 can be used to secure first member 906 and second member 907 in an extended and/or retracted position.

Figure 9D:
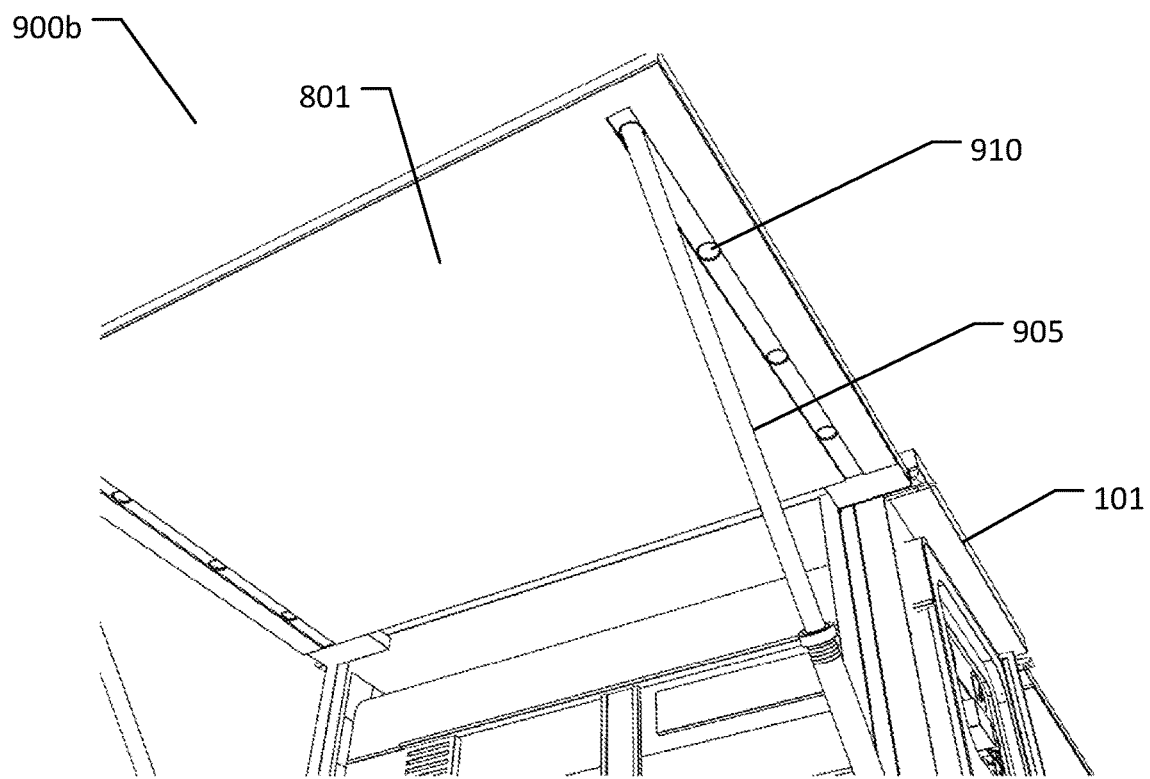
FIG. 9D illustrates extendable rods in an extended position.

FIG. 9D illustrates extendable rods 905 at an extended position 900b. In extended position 900b, extendable rods 905 can support slideable walls 801 in open position, wherein slideable walls 801 can be in a horizontal position along with the top surface of top enclosure 201. As such, after the user positioned slideable walls 801 in open position, the user can then adjust the length of extendable rods 905 and then lock extendable rods 905 to keep the desired length. In one embodiment, the bottom end of each extendable rod 905 can attach to the bottom portion of housing 101 while the top end of extendable rod 905 can be connectable to the outer surface of slideable walls 801. In such embodiment, slideable walls 801 can comprise one or more catches 910 that can be mateable with the top end of extendable rod 905. Catches 910 can secure the top end of extendable rod 905 within slideable walls 801.

Figure 10:
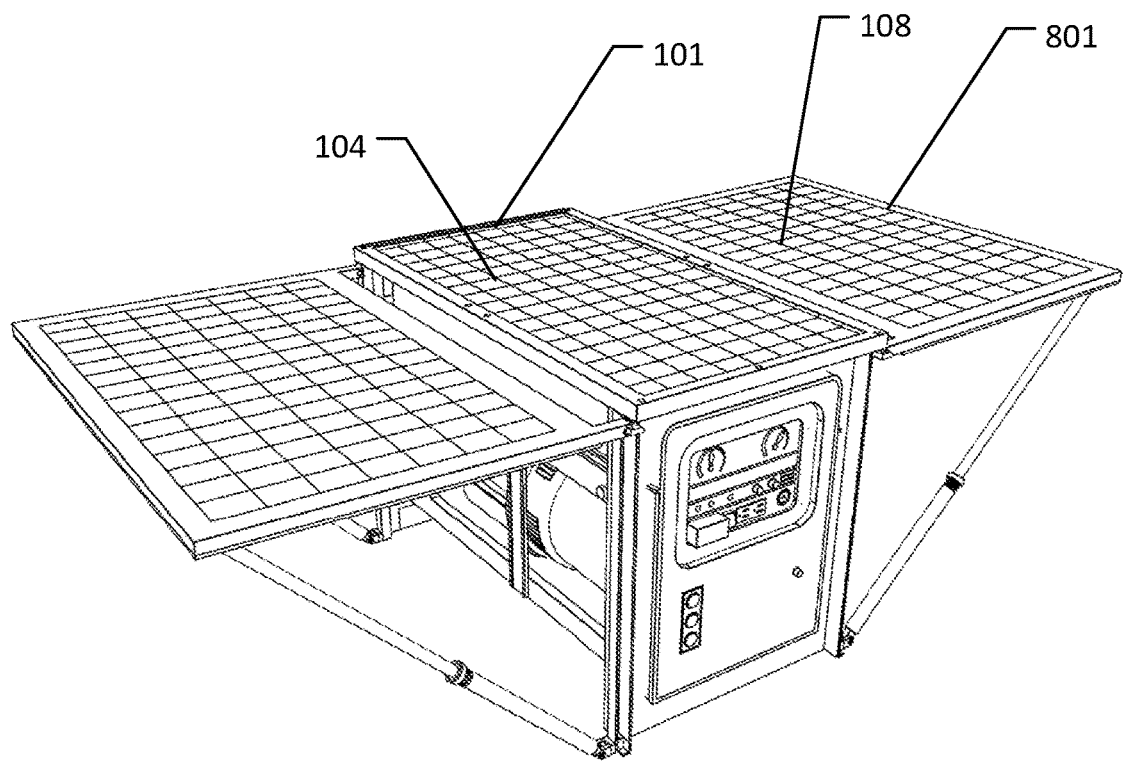
FIG. 10 illustrates an embodiment of slideable walls positioned horizontally along the top portion of a housing

FIG. 10 illustrates an embodiment of slideable walls 801 positioned horizontally along the top portion of housing 101. In this embodiment, slideable walls 801 can be positioned horizontally and in parallel with top wall 104. Such embodiment can be used when sunlight is directly above welding system 100.

Figure 11:
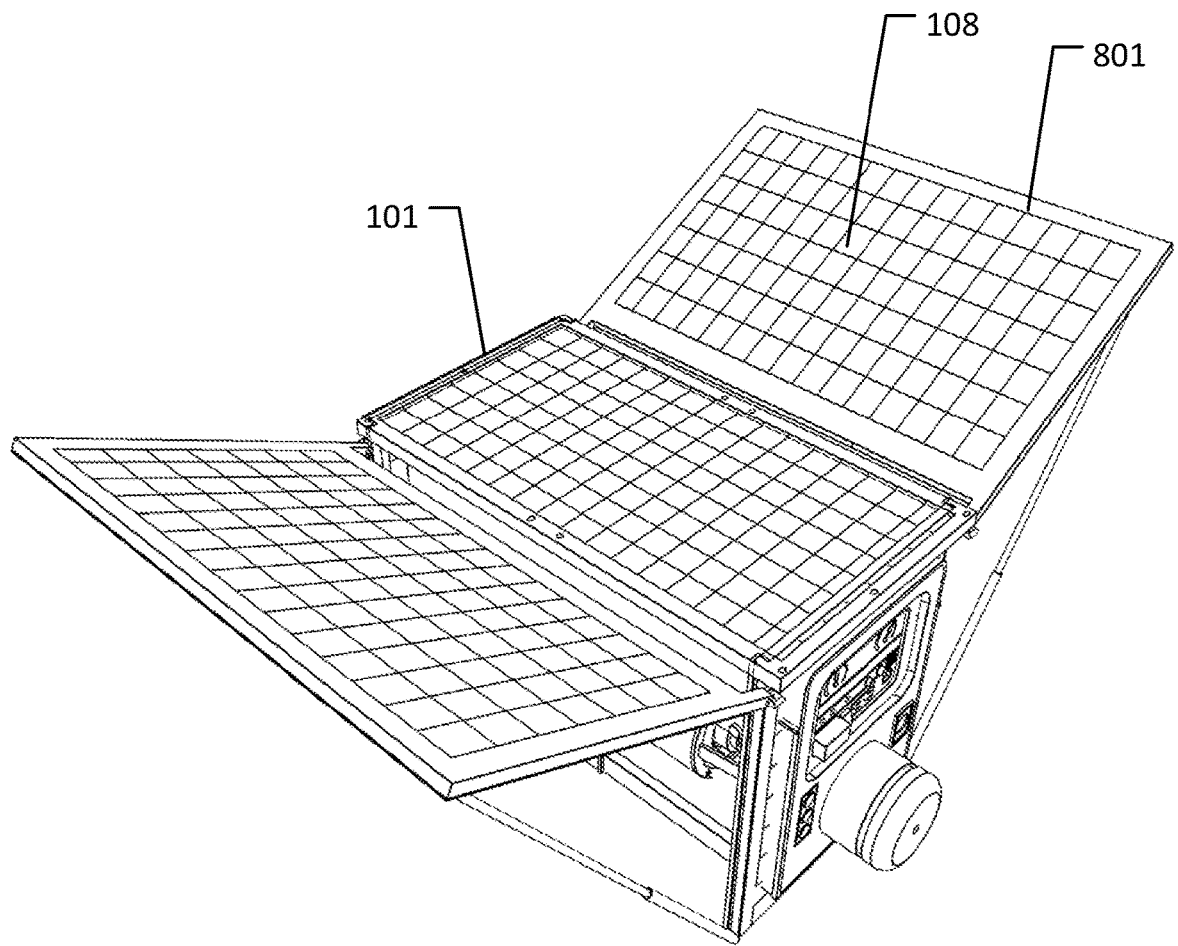
FIG. 11 illustrates an embodiment of slideable walls angled upwards along the top portion of a housing.

FIG. 11 illustrates an embodiment of slideable walls 801 angled upwards along the top portion of housing 101. Slideable walls 801 can be used to maximize sunlight capturing. In this embodiment, the user can position the angle of each slideable wall 801 such that solar panels 108 can be clear from any obstruction and can receive maximum amount of solar radiation from the sun. In such embodiment, each slideable wall 801 can be independently angled and can be positioned such that solar panels 108 face the sunlight.

Various changes in the details of the illustrated operational methods are possible without departing from the scope of the following claims. Some embodiments may combine the activities described herein as being separate steps. Similarly, one or more of the described steps may be omitted, depending upon the specific operational environment the method is being implemented in. It is to be understood that the above description is intended to be illustrative, and not restrictive. For example, the above-described embodiments may be used in combination with each other. Many other embodiments will be apparent to those of skill in the art upon reviewing the above description. The scope of the invention should, therefore, be determined with reference to the appended claims, along with the full scope of equivalents to which such claims are entitled.

In the appended claims, the terms "including" and "in which" are used as the plain-English equivalents of the respective terms "comprising" and "wherein."

What is claimed is:

1. A solar-powered portable housing for a tool comprising
a battery;
one or more solar panels connectable to said battery, said solar panels provide power source to said battery;
a plug that connects to said battery, said plug charges said battery by connecting said plug to an electric power source;
a top enclosure capable of housing a tool;
a bottom enclosure capable of housing said battery, said battery capable of providing power to said tool;
a first slideable wall mounted to one side of said housing;
a first solar panel mounted to said first slideable wall;
tracks attached to said housing;
guides attached to a bottom edge of said first slideable wall, said guides slideably fixed within said tracks, such that said first slideable wall is vertically maneuverable along said tracks;
a second slideable wall mounted to a second side of said housing, said second slideable wall at the opposite side of said first housing from said first slideable wall; and
a second solar panel mounted to said second slideable wall;
second tracks attached to said housing, and
second guides attached to a bottom edge of said second slideable wall said second guides slideably fixed within said second tracks, such that said second slideable wall is vertically maneuverable along said second tracks;
wherein said first solar panel is mounted at an inner surface of said first slideable wall such that said first solar panel faces an interior of said housing in a closed position and faces away from said interior of said housing while in an open position; wherein said first slideable wall entirely covers said one side of said housing in said closed position.

2. The system of claim 1 wherein said first slideable wall comprises a fastener system that holds said first slideable wall in said closed position.

3. The system of claim 2 wherein said fastener system comprises a hook and a latch, further wherein said hook attaches to a top edge of said first slideable wall and said latch attaches to one side of said top enclosure, wherein said hook mateable with said latch.

4. The system of claim 1 wherein said second solar panel is mounted at an inner surface of said second slideable wall such that said second solar panel faces an interior of said housing when in a second closed position and faces away from said interior of said housing while in a second open position.

5. The system of claim 4 wherein said second slideable wall comprises a fastener system that holds said second slideable wall in said second closed position.

6. The system of claim 5 wherein said fastener system comprises a hook and a latch, further wherein said hook attaches to a top edge of said second slideable wall and said latch attaches to another side of said top enclosure, wherein said hook is mateable with said latch.

7. The system of claim 1 further comprising one or more extendable rods, said extendable rods positionable in
a retracted position wherein a first slideable rod rests at one side of said housing when said first slideable wall is in said closed position; and
an extended position supporting said first slideable wall in said open position.

8. The system of claim 1 further comprising a drawer within said bottom enclosure, said drawer slideably removable from said bottom enclosure, said drawer capable of housing said battery.

* * * * *